United States Patent [19]

Hinriksson et al.

[11] Patent Number: 5,105,572

[45] Date of Patent: Apr. 21, 1992

[54] CONSTRUCTION OF AND TECHNIQUE FOR FASTENING WEAR SHOES TO A TRAWL DOOR

[76] Inventors: Josafat Hinriksson, Fornistekkur 10; Birgir T. Josafatsson, Engjaseli 56; Smari Josafatsson, Engjaseli 72, all of IS-109 Reykjavik; Fridrik Josafatsson, Spordagrunn 2, IS-104 Reykjavik, all of Iceland

[21] Appl. No.: 505,254

[22] Filed: Apr. 5, 1990

[30] Foreign Application Priority Data

Feb. 15, 1990 [IS]  Iceland .................................. 3548

[51] Int. Cl.$^5$ ............................................. A01K 73/02
[52] U.S. Cl. ........................................... 43/9.7; 43/9.4
[58] Field of Search ................... 43/9.1, 9.4, 9.5, 9.7

[56] References Cited

U.S. PATENT DOCUMENTS 4,344,247  8/1982  Howard ................................ 43/9.7

FOREIGN PATENT DOCUMENTS

| 0553608 | 5/1923 | France | 43/9.7 |
| 0791060 | 12/1935 | France | 43/9.7 |
| 7811617 | 5/1980 | Netherlands | 43/9.4 |
| 0014986 | of 1908 | United Kingdom | 43/9.7 |
| 0002455 | of 1913 | United Kingdom | 43/9.7 |
| 0356529 | 9/1931 | United Kingdom | 43/9.7 |
| 0483479 | 4/1938 | United Kingdom | 43/9.7 |
| 0772885 | 4/1957 | United Kingdom | 43/9.7 |

Primary Examiner—Kurt Rowan
Attorney, Agent, or Firm—Frishauf, Holtz, Goodman & Woodward

[57] ABSTRACT

A wear shoe apparatus for protecting the bottom of a trawl door used to open a trawl being pulled behind a fishing boat. A lower wear shoe is provided with a bottom and two walls extending upward therefrom to define a channel sized to accommodate therein an upper wear shoe. Holes in the side walls are aligned with each other and with a corresponding hole in the upper wear shoe, with such holes permitting an elongated fastening member to pass therethrough for fastening the wear shoes to each other. The wear shoes are constructed of a very wear-resistant and durable material, such as manganese steel alloys. A mudshoe can be made an integral part of the lower wear shoe. Wear shoes and mudshoes can be installed, removed and replaced with greater ease and in less time.

1 Claim, 8 Drawing Sheets

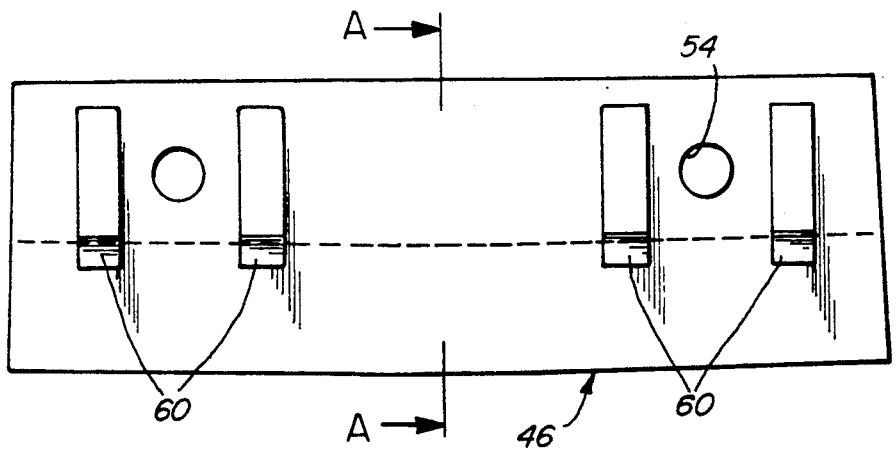
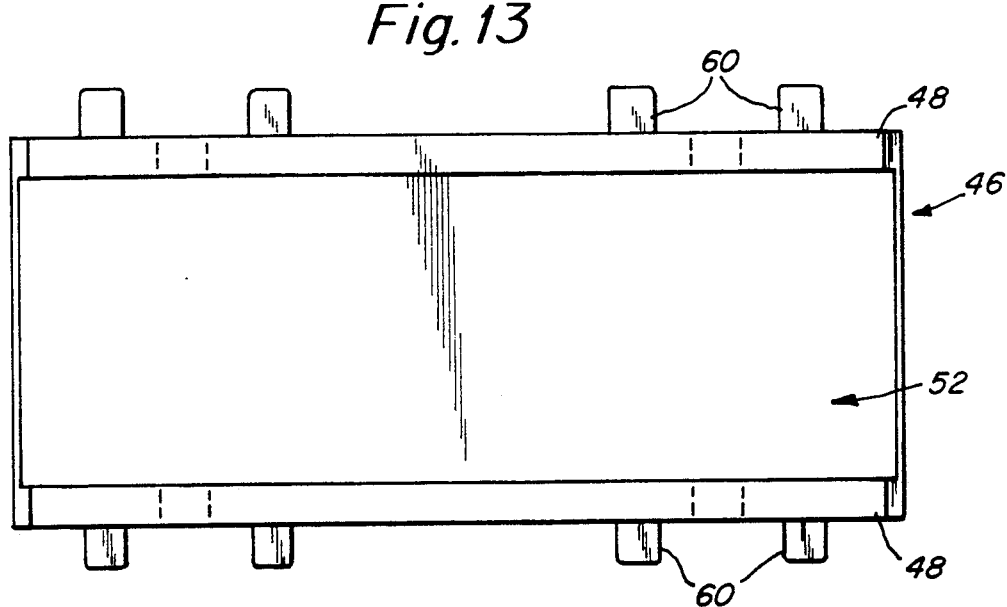
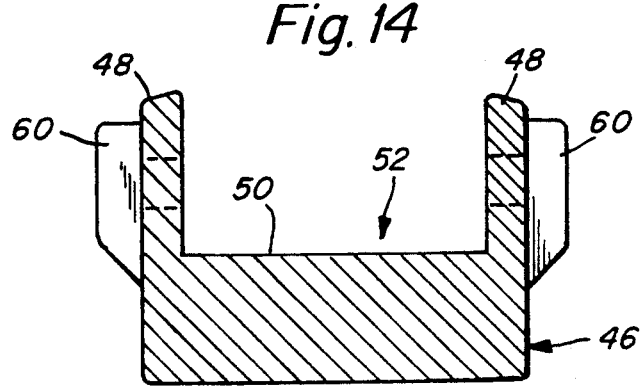

CONSTRUCTION OF AND TECHNIQUE FOR FASTENING WEAR SHOES TO A TRAWL DOOR

BACKGROUND OF THE INVENTION

The present invention is directed to wear shoes used to protect a trawl door being dragged on a sea bottom for opening a trawl being towed behind a fishing boat and, more particularly, to a technique for attaching such wear shoes to the trawl door in a manner that facilitates attachment, removal, and replacement thereof.

As is well known, a trawl is a large conical net towed behind a fishing boat for the purpose of gathering fish or other marine life. In order to keep the trawl open so that it can capture marine life within its confines, a pair of trawl doors are typically used to open up the fishing trawl. The fishing trawl can be a bottom trawl, pelagic trawl, or semi-pelagic trawl. The bottom trawls and the trawl doors used with them are dragged continuously on the sea bottom. The pelagic trawls and the trawl doors used with them float in the water and do not normally touch the sea bottom. The semi-pelagic trawls and the trawl doors used with them do come in contact with the sea bottom from time to time.

The lowest part of a trawl door is obviously the part subject to the most wear since it is dragged on the sea bottom. This part of the trawl door is designed to be the heaviest part for the purpose of providing increased stability of the trawl doors. This lowest portion of the trawl doors will be referred to as the "keel" hereinafter. In order to protect the keel from wear, special stumps are fitted on the keel bottom. These stumps are called trawl door wear shoes, and they are made of very durable and wear-resistant material such as manganese steel alloys or other alloys with similar properties. Several wear shoes are typically used to cover the entire length of the keel. The number of wear shoes that are required depends on the length of each wear shoe relative to the length of the keel. Trawl doors are produced in many different sizes and types depending on the use to which they will be put and on the conditions at the fishing grounds. The wear shoes are commensurately customized for the various types of available trawl doors. The wear shoes are welded to the keel bottom, or fastening devices such as bolts and rivets can be used as well. The term "attach" is used herein to refer generically to all the ways in which wear shoes are connected to drawl doors.

As stated above, a variety of trawl door types is available, with a particular one being used for a particular set of uses and conditions. For example, the sea bottom can change from being very soft (small grained sand) to rocky (covered with big rocks). Also, fishermen may have their own preference as to what fishing method will be used, and this also affects the choice of the trawl doors. To fulfill the demands of customers for trawl doors that are adapted to fit these different situations, variants of trawl door wear shoes are provided under the keel. For example, FIGS. 1 and 2 depict an oval trawl door 1 having a rear steel plate 3 and a front steel plate 5 separated from each other by vertical slot 7. Protective steel bars 8 and 9 are provided, respectively, on the front and rear of trawl door 1. The bottom portion of trawl door 1 is provided with keel 11 that has a curved bottom surface in its longitudinal direction as depicted in FIG. 1. A single layer 13 of wear shoes is attached to the bottom of keel 11. This single layer of wear shoes can include several types such as A used for the front and back, M used in the center section, and one-half M which is half the size of an M-type of door shoe. A piece 15 called a "backstrops ear" is welded to back plate 3. Rigging is fastened to this ear with shackles in a conventional manner. The rear end of the keel is protected by a stump 17 preferably made of very durable and wear-resistant manganese steel alloys. The front part of keel 11 is protected by round steel bar 19. This construction for a trawl door 1 is conventional, and providing specific details of each and every component of the trawl door is, therefore, not believed to be necessary. Such trawl doors are readily available from J. Hinriksson Ltd., Reykjavik, Iceland.

FIG. 3 shows a trawl door 1 exactly the same as that depicted in FIGS. 1 and 2, but with one exception. Whereas the trawl door 1 depicted in FIGS. 1 and 2 has only upper wear shoes 13, trawl door 1 of FIGS. 3 and 4 has affixed to layer 13 of wear shoes another layer of bottom wear shoes 21. Such a second layer of wear shoes may be desirable to increase stability of the trawl door due to the added weight. Also, the added weight may be necessary for deep fishing with the trawls where the trawl doors must drop to a lower depth than usual. As best seen in FIG. 4, the bottom wear shoes 21 are welded to upper wear shoes 13. At the front of bottom wear shoes 21 is provided a bar 23 made of the same manganese steel alloys mentioned above.

When trawl doors are utilized on a sea bottom which is very soft, it is advantageous to use wide and thick steel plates, known as mudshoes, made of the same durable and wear-resistant manganese steel alloys mentioned above. These mudshoes assist in preventing the trawl doors from sinking into the soft sea bottom and thus being more difficult to be dragged on the sea bottom. When these mudshoes are utilized, two different variants are possible. The first variant is the same as the oval steel trawl door version depicted in FIGS. 1 and 2, with the exception that the mudshoes are attached under the wear shoes 13. The other variant is depicted in FIG. 5. Mudshoes 23 are welded to and between both layers of wear shoes.

In the various versions of trawl doors described above with respect to FIGS. 1-5, upper wear shoes 13 can be attached to keel 11 by welding, bolting, rivetting or other attachment means. However, when a lower layer of wear shoes 21 has been utilized, it is welded to the upper wear shoes 13. Likewise, when mudshoes 23 are utilized, these are welded to upper wear shoes 13 and also to lower wear shoes 21, if utilized. Welding of the bottom wear shoes and/or the mudshoes under the upper wear shoes 13 is a time consuming process. Likewise, a considerable amount of time is required to replace these parts, as is necessary when it is expected that different conditions will be encountered than those for which the presently installed wear shoes were designed.

If repairs and changes to fishing equipment require a considerable amount of time, the fishing vessel may be prevented from properly carrying out its fishing operations, if at all, and this can cause substantial monetary loss. On the other hand, replacement of trawl door wear shoes and/or mudshoes is necessary and unavoidable to accommodate different fishing conditions as well as for maintenance of the trawl doors. Consequently, an approach had to be developed for improving the prior art trawl doors by facilitating the attachment, removal and replacement of the bottom wear shoes 21 and mudshoes 23. This will enable a trawl door with a single layer of wear shoes to be modified into a double layer and/or be outfitted with mudshoes. Likewise, a trawl door fitted with a bottom layer of wear shoes and/or mudshoes can have these readily removed so as to leave only the upper layer of wear shoes. A technique which permits such ready attachment, removal and replacement of wear shoes and/or mudshoes can result in significant savings in work, time and money.

SUMMARY OF THE INVENTION

A primary object of the present invention is to provide a wear shoe construction and a technique for attaching such wear shoes to a trawl door that permits faster and more convenient removal and replacement thereof.

Another object of the present invention is to provide a technique for attaching lower and upper wear shoes to each other in such a way that a fastener is passed through the very durable and wear-resistant material forming the shoes so as to have the material contribute to the strength and durability of the attachment therebetween.

Yet another object of the present invention is to provide a technique that facilitates attachment, removal and replacement of mudshoes on trawl doors.

Still another object of the present invention is to fit and engage the lower and upper wear shoes with each other in such a way as to contribute to the strength of the attachment.

A further object of the present invention is to construct the wear shoes with a shape that prolongs their useful life by making it possible to move a wear shoe from a higher wear region to a lower wear region of the keel and to reverse the front and back of the wear shoes.

These and other objects of the present invention are attained by one aspect of the present invention directed to an apparatus attachable to a door used in opening a trawl being pulled behind a fishing boat, and comprising an upper wear shoe adapted to be fixed to a bottom portion of said trawl door. A bottom wear shoe is removably fastened to, and below, the upper wear shoe. A means is provided for removably fastening the bottom wear shoe to the upper wear shoe.

Another aspect of the present invention is directed to a construction of the bottom wear shoe which comprises a bottom having an upper surface and a lower surface, two side walls extending upward from the bottom and having respective inner and outer surfaces, whereby a channel is defined by the upper surface of said bottom and the inner surfaces of the side walls, said channel being sized to be adapted to accommodate the upper wear shoe, said side walls having a plurality of through holes formed therein, with corresponding holes in the side walls being aligned with each other and adapted to receive therein an elongated fastening member.

Yet another aspect of the present invention is directed to apparatus attachable to a door used in opening a trawl being pulled behind a fishing boat, and comprising a support portion adapted to be at the bottom of said door and on which said door rests while being dragged along a sea bottom, an integral wear shoe and mudshoe having a wear shoe coupled to, and below, said support portion and a mudshoe extending laterally of said wear shoe, and means for attaching the integral wear shoe and mudshoe to the support portion.

BRIEF DESCRIPTION OF THE DRAWINGS

FIG. 12 is an elevational view of a wear shoe constructed in accordance with the present invention, and having a slightly curved bottom surface.

FIG. 13 is a top view of the wear shoe depicted in FIG. 12.

FIG. 14 is a cross section taken along line A—A in FIG. 12.

DETAILED DESCRIPTION OF THE PREFERRED EMBODIMENTS

Figure 1:
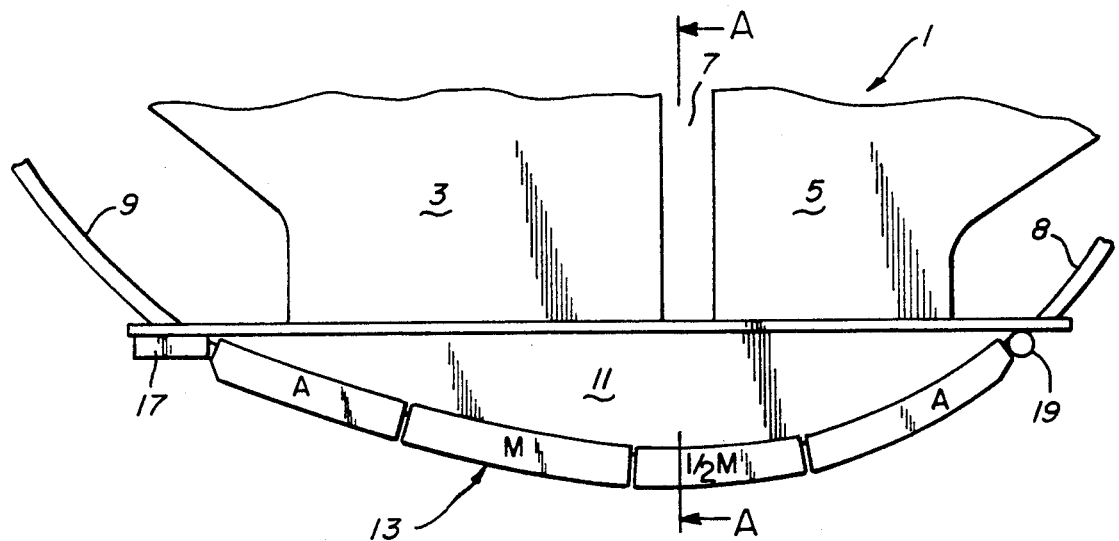
FIG. 1 is an elevational view, partially cut away, of a prior art oval steel trawl door having a curved bottom surface, and with a single layer of wear shoes.
Figure 2:
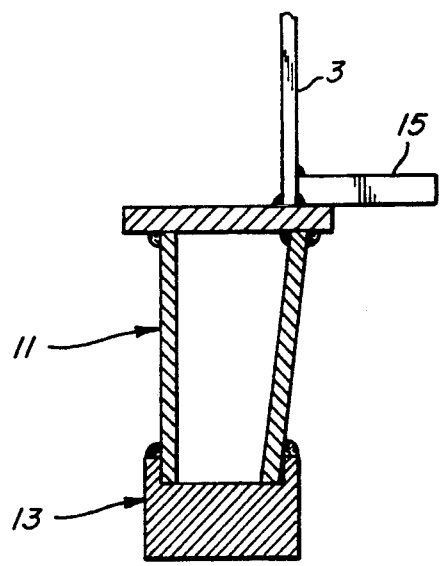
FIG. 2 is a cross section of the trawl door in FIG. 1 taken along line A—A.
Figure 3:
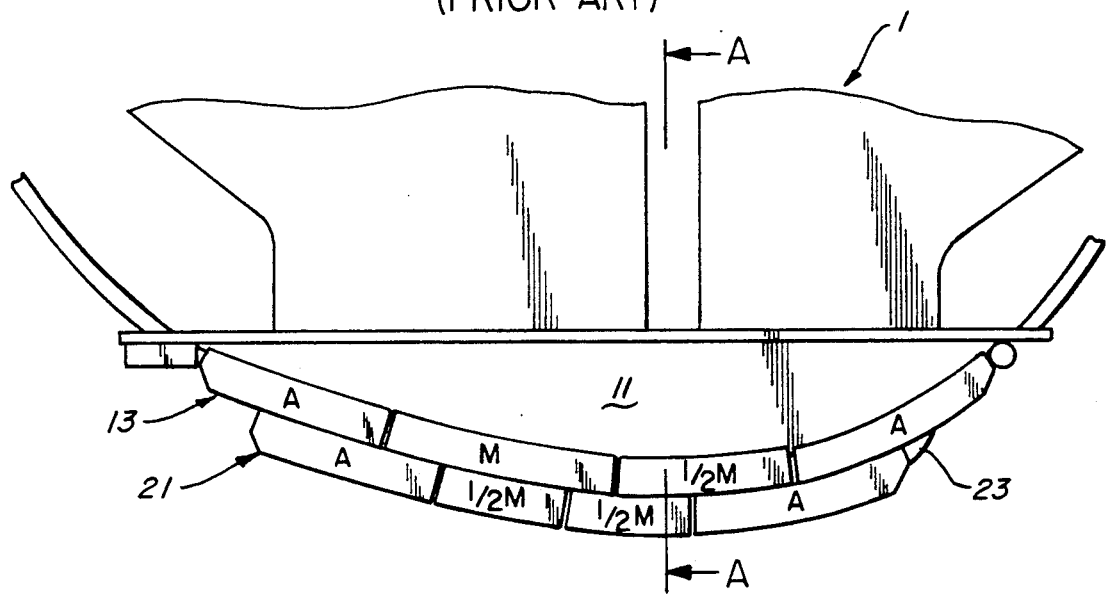
FIG. 3 is a view of a prior art oval steel trawl door similar to that of FIG. 1, and having two layers of wear shoes.
Figure 4:
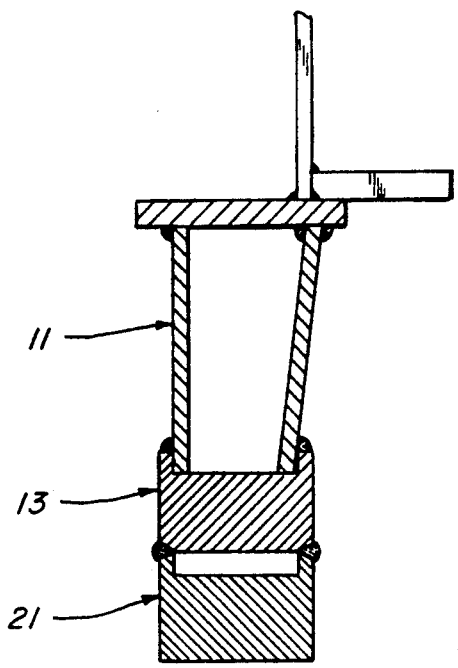
FIG. 4 is a cross section of the trawl door depicted in FIG. 3, and taken along line A—A.
Figure 5:
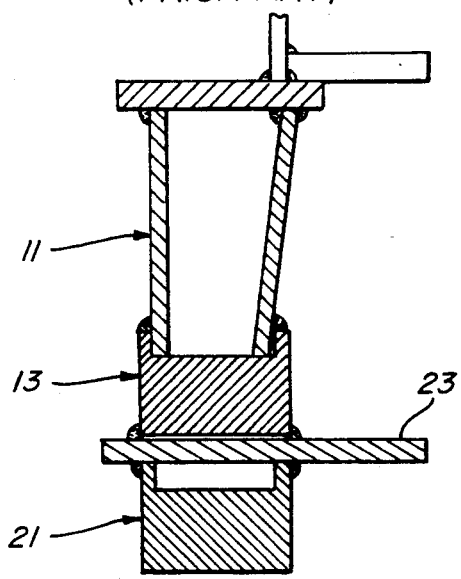
FIG. 5 is a cross sectional view similar to that of FIG. 4, with the exception that a mudshoe is attached between the upper and lower wear shoes.
Figure 6:
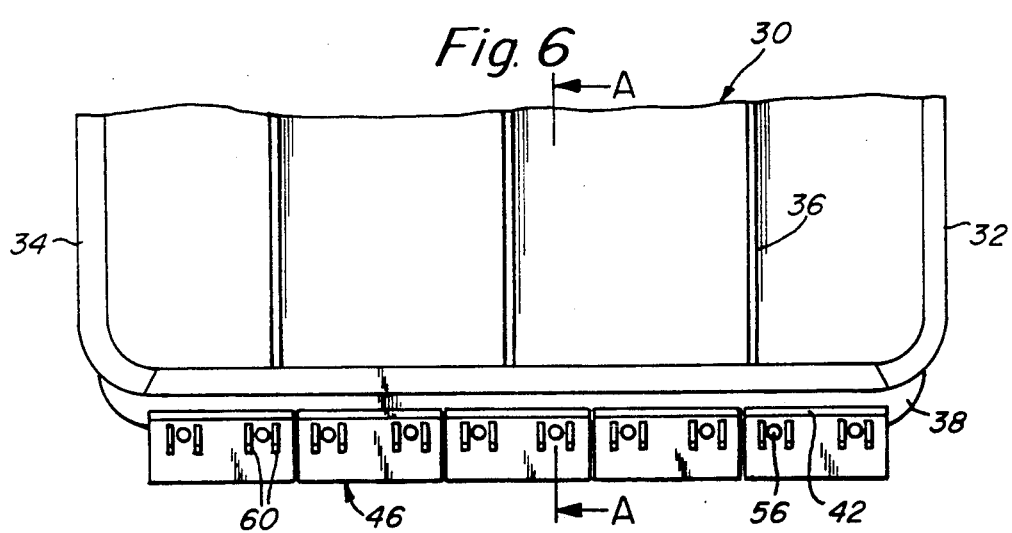
FIG. 6 is an elevational view of another type of trawl door having a straight bottom surface, and including two layers of wear shoes attached to each other in accordance with the present invention.
Figure 7:
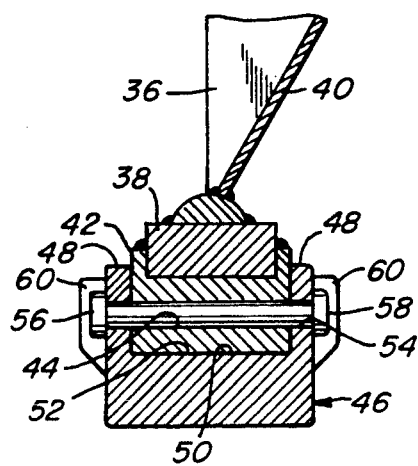
FIG. 7 is a cross sectional view of FIG. 6 taken along line A—A.

FIGS. 6 and 7 depict an embodiment of the present invention. Trawl door 30 is constructed of front steel rods 32 and rear steel rods 34 to protect, respectively, the front and rear of the trawl door. Flat bars 36 provide reinforcement to strengthen the trawl door. The bottom of trawl door 30 includes a flat steel bar 38 to which is attached an upwardly extending steel plate 40 that produces a V-shape for the trawl door. Bar 38 can be considered as being a keel for our purposes. As best seen in FIG. 7, upper wear shoe 42 is formed with an upper channel in which bar 38 is snugly accommodated. Wear shoe 42 is fixed to bar 38, as by welding. The term "fixed" is used herein to describe a permanent mode of attaching parts to each other, such as by welding, which is quite difficult to loosen. Up to this point, the structure of trawl door 30 is conventional.

In accordance with the principles of the present invention, upper wear shoe 42 is provided with a hole 44 extending transversely therethrough. Wear shoe 42 is casted with this hole 44 formed therein. Lower wear shoe 46 has upwardly extending walls 48 which, together with upper surface 50 form a channel 52. Walls 48 are also provided with openings 54 that are in alignment with opening 44 of upper wear shoe 42. Bolt 56 is passed through the aligned openings 44 and 54, and nut 58 fastens the assembly to securely, but removably, attach upper and lower wear shoes 42 and 46 to each other. The term "fasten" is used herein to describe a mode of attaching two parts to each other that can readily be loosened to separate the respective parts from each other.

Lower wear shoe 46 is provided with protection stumps 60 extending laterally of holes 54 and projecting outward at a distance slightly greater than bolt 56 and/or nut 58. This prevents damage to bolt 56 and/or nut 58 which would compromise the integrity of the attachment.

Figure 9:
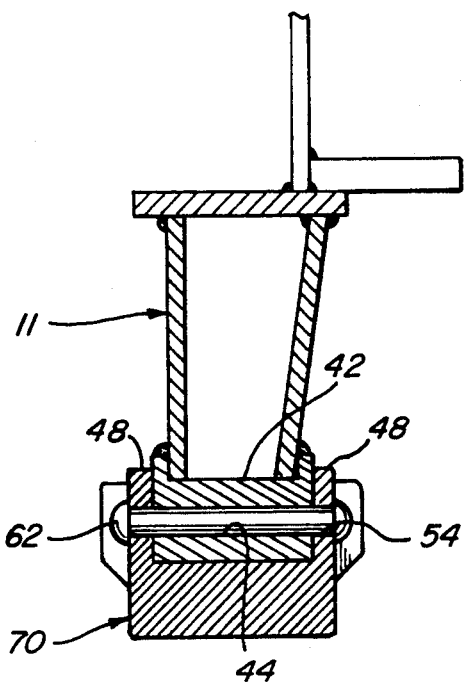
FIG. 9 is a cross sectional view of FIG. 8 taken along line A—A.

An important aspect of the wear shoes is the manner in which upper wear shoe 42 fits within channel 52 of lower wear shoe 46. As best seen in FIG. 7, the rectangular cross section of upper wear shoe 42 is sized to be snugly received within channel 52. Because of this snug fit, a minimal amount of twisting motion occurs between wear shoes 42 and 46. This has the beneficial result of producing a better, more secure and more reliable attachment between the wear shoes 42 and 46, and it also reduces the strain that otherwise would be applied to bolt 56. Thus, walls 48 of lower wear shoe 46 are made sufficiently thick so as to have the requisite lateral strength for holding upper wear shoe 42 therein, withstanding the twisting motion to which upper wear shoe 42 may be exposed, and also to be capable of absorbing the considerable external shocks applied to it while being dragged along the sea bottom. Walls 48 are also made sufficiently high relative to the height of upper wear shoe 42 to provide an area of engagement therebetween that assists in forming a secure attachment. As shown in FIGS. 7 and 9, the height of sidewalls 48 is approximately equal to the height of the upper wear shoe so that the contact area for generating attachment forces is maximized. The relative dimensions of the walls 48 in terms of thickness and height do, of course, vary in relation to the size of the wear shoes, but these are evident to one with ordinary skill in the art. In addition, the use of walls 48 is also helpful during assembly of the wear shoes because they serve as guides for accurately seating upper wear shoes 42 relative to lower wear shoes 46. Furthermore, walls 48 also provide the means in which openings are formed in lower wear shoe 46, and through which openings the bolt 56 can be passed for attaching lower wear shoes 46 to upper wear shoes 42 in accordance with the present invention. One other advantage of walls 48 is that they also serve to provide protection against damage to the sides of the trawl door keel.

As can readily be appreciated from the above, the design of wear shoes 42 and 46 in accordance with the present invention is effective in terms of securely attaching them to each other as well as in facilitating the removal of lower wear shoes 46 for the purpose of either replacement thereof or merely to provide a trawl door with only a single layer of wear shoes. The construction of the wear shoes makes it possible to position them on the front or rear of the keel, and each wear shoe can also be reversed front to back. This is a significant advantage in terms of increasing the useful life of a wear shoe because, as the front of the trawl doors is raised by approximately 7° from the sea bottom, most of the wear is on its rear end. Thus, wear shoes mounted on the rear can be moved forward, and wear shoes mounted one way can be reversed to have the rear end become the forward end. Thus, the wear on a shoe is more evenly distributed to prolong its life by enabling it to be moved along the keel and reversed front to back. Various other advantages stem from this design approach, as will become apparent from the ensuing discussion.

Figure 8:
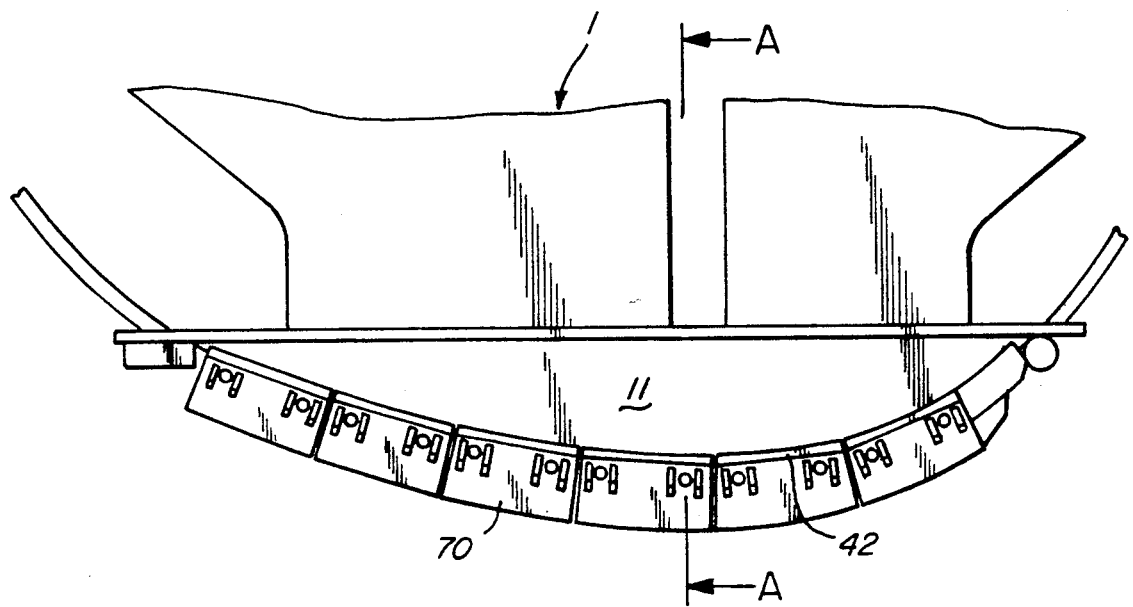
FIG. 8 is a view similar to FIG. 3, with the exception that the upper and lower wear shoes are attached to each other in accordance with the present invention.

FIG. 8 is, generally speaking, similar to FIG. 6, although it shows a trawl door with a curved bottom surface whereas FIG. 6 shows one with a straight bottom surface. However, the more significant view of the construction is shown by FIG. 9. Flat steel plate 38 of FIG. 7 is replaced by the type of keel 11 shown in FIGS. 1-5. The manner in which upper wear shoe 42 is attached to lower wear shoe 70 remains the same as in the previous embodiment of FIGS. 6 and 7. In particular, holes 44 and 54 are provided, respectively, in upper wear shoe 42 and lower wear shoe 70. However, whereas the FIG. 7 embodiment utilizes bolt 56, the FIG. 9 embodiment utilizes a rivet 62 for the purpose of fastening the upper and lower wear shoes 42 and 70 to each other.

Figure 10:
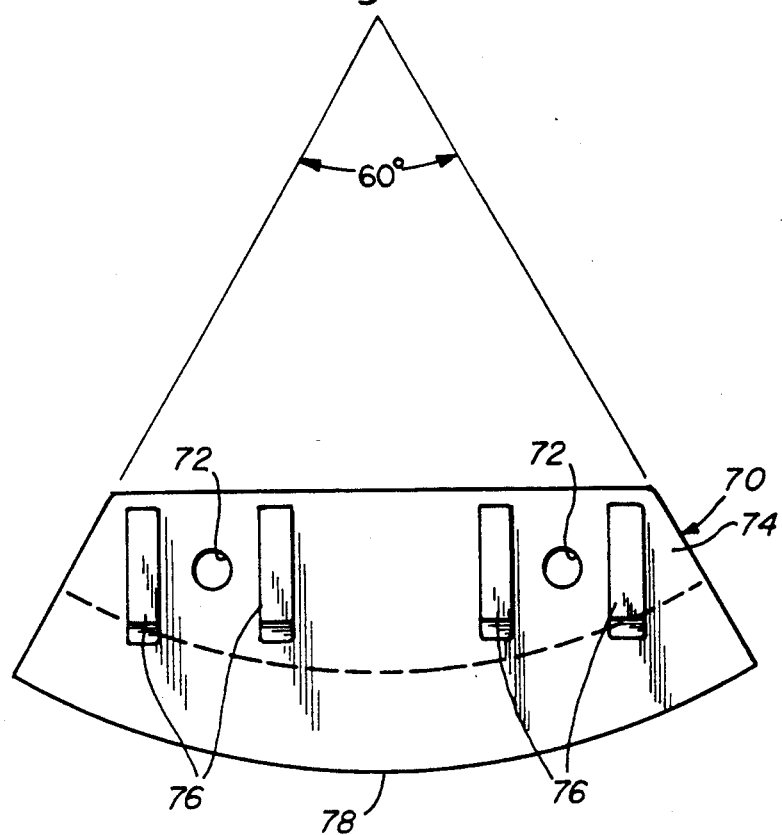
FIG. 10 is an elevational view of a single wear shoe having an arcuate bottom surface and constructed in accordance with the present invention.
Figure 11:
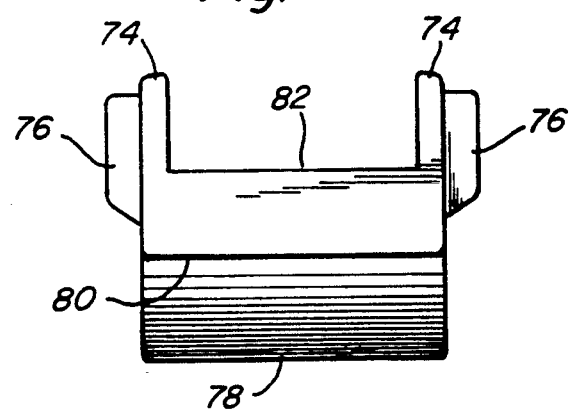
FIG. 11 is a side elevational view of the wear shoe depicted in FIG. 10.

FIGS. 10 and 11 depict an enlarged, detailed version of the lower wear shoe 70 shown in FIGS. 8 and 9. In particular, wear shoe 70 is provided with hole 72 formed in its walls 74. Protection stumps 76 are provided on either side of hole 72 for the purpose of protecting a bolt or rivet (not shown) used to attach this wear shoe to an upper wear shoe. This version of a wear shoe has an arcuate lower surface 78, and its length extends through an arc of 60°. The radius of curvature is 20-25 cm, for example. The forward edge of wear shoe 70 is depicted by the numeral 80 in FIGS. 10 and 11. Upper surface 82 combines with walls 74 to form a channel in which an upper wear shoe (not shown) is received in the manner described above.

FIGS. 12-14 depict a wear shoe formed in accordance with the principles of the present invention. It is an expanded representation of the wear shoe 46 shown in FIGS. 6 and 7.

Figure 15:
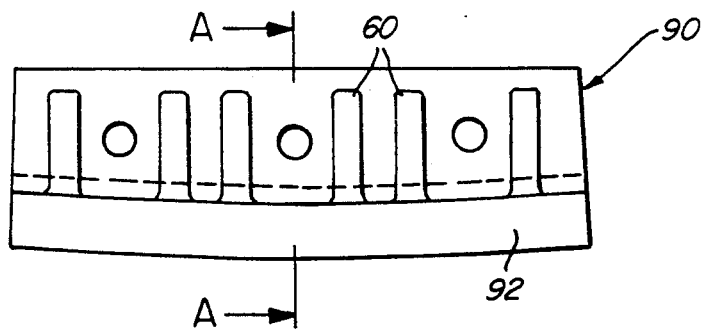
FIG. 15 is an elevational view of a wear shoe constructed in accordance with the present invention, and having a mudshoe integrally attached thereto.
Figure 16:
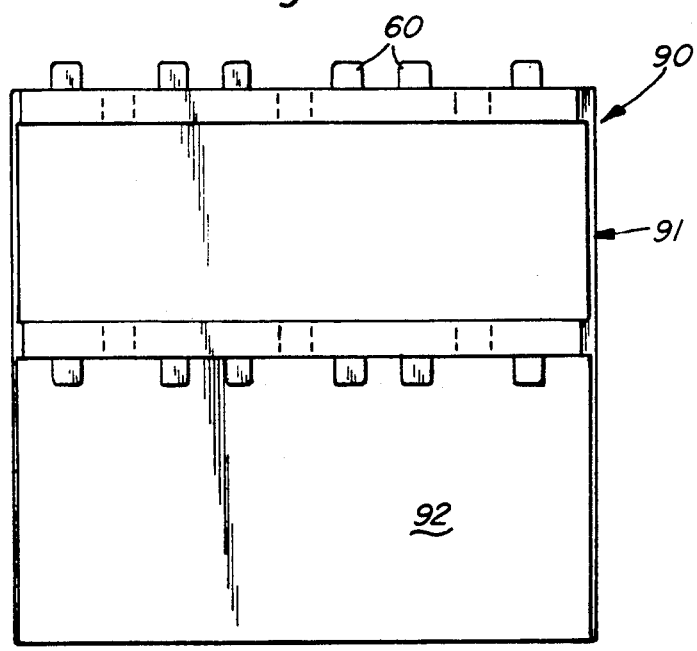
FIG. 16 is a top view of the wear shoe shown in FIG. 15.
Figure 17:
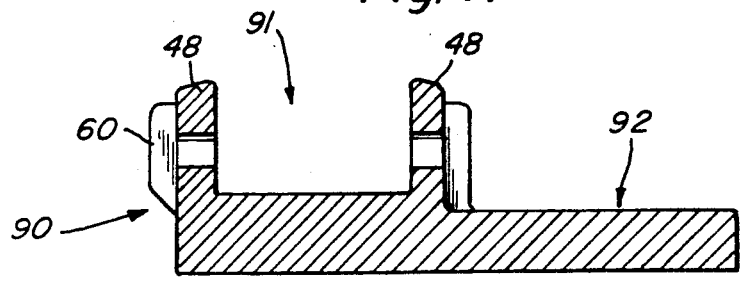
FIG. 17 is a cross section taken along line A—A in FIG. 15.

As explained above, it is advisable to use mudshoes in conditions where the sea bottom is very soft. The prior art approaches, particularly that shown in FIG. 5, weld a mudshoe to the upper wear shoes and also to the lower wear shoes, if used. An entirely different approach is adopted in accordance with the present invention. As shown in FIGS. 15-17, lower wear shoe 90 has a portion 91 similar to wear shoe 70 discussed just above. Wear shoe 90 also has an extension integrally attached to portion 91 which functions as mudshoe 92.

Figure 18:
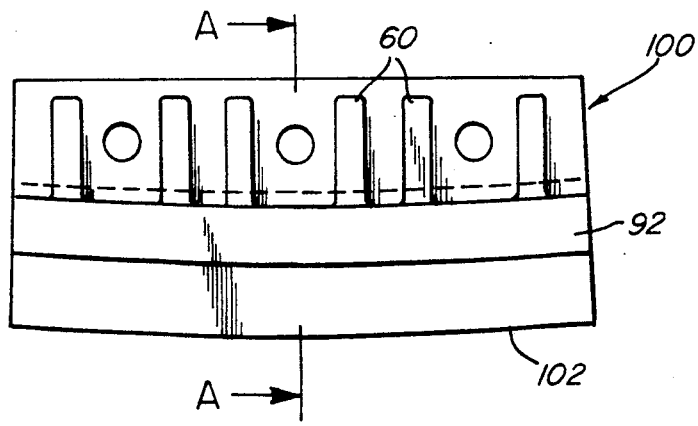
FIG. 18 is a wear shoe equivalent in height to two layers of wear shoes, and having an integrally attached mudshoe.
Figure 19:
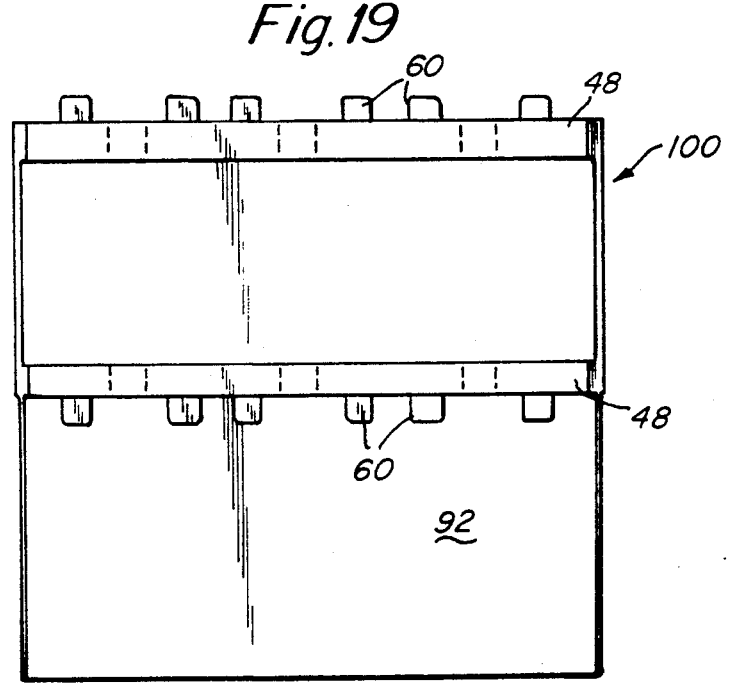
FIG. 19 is a top view of the wear shoe shown in FIG. 18.
Figure 20:
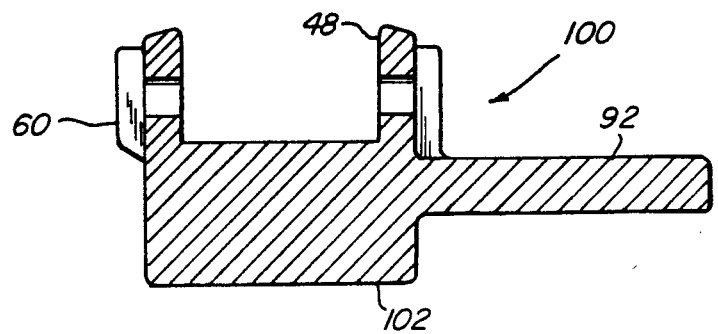
FIG. 20 is cross section taken along line A—A in FIG. 18.

FIGS. 18-20 depict a wear shoe 100 that is very similar to wear shoe 90, but with the exception that the bottom thereof is provided with a downwardly extending projection 102 that acts as an extra wear shoe. The latter provides additional weight, and enables the trawl door to function better on a soft sea bottom.

With the arrangement of FIGS. 15-20, the mudshoe can be readily assembled, removed and replaced by taking advantage of the fastening technique of the present invention. Specifically, the mudshoe need no longer be welded to the upper wear shoe. Also, separate attachment steps dedicated to the mudshoe are no longer necessary. Instead, the present invention, firstly, facilitates attachment of the mudshoe because welding is no longer necessary and, secondly, separate attachment steps for the mudshoe alone are no longer necessary because it is attached together with a wear shoe.

As is readily apparent from the above, the present invention provides a construction of wear shoes made of very durable and wear-resistant material, such as manganese steel alloy, which enables attachment of the upper and lower wear shoes with each other by a fastening device that passes through the material in such a way as to contribute to the strength of the attachment, make the attachment more reliable, and prolongs the life of the fastening device. Also, the present invention provides a technique for attaching wear shoes and mudshoes that has applicability to many different sizes and shapes of trawl doors and wear shoes. Besides being so flexible in terms of shapes and dimensions, the present invention facilitates the assembly, removal and replacement of wear shoes and/or mudshoes by minimizing the necessity to rely on welding while, at the same time, providing a strong, secure and reliable attachment to withstand the adverse and rugged conditions to which such equipment is exposed during operational use thereof. In addition, the upwardly facing channel in the lower wear shoes provide a convenient seat that facilitates fitting the upper wear shoes within the lower wear shoes and properly aligning the holes formed respectively therein. Moreover, the snug fit and considerable contact area between the upper and lower wear shoes decreases the strain on the bolt or rivet and reinforces the strength of the overall attachment.

Although preferred embodiments of the present invention are described in detail above, it is apparent to anyone with ordinary skill in the art that various modifications thereto can readily be made. For example, the snug fit of an upper wear shoe in the channel of a corresponding lower wear shoe is achieved with substantially rectangular transverse cross sections. The same can be achieved if such a cross section departs somewhat from a rectangular shape. The term "substantially rectangular" as used herein defines any shape that appreciably resists rotation of the upper and lower wear shoes relative to each other due to respective walls thereof being in opposed engagement. A third layer of wear shoes can be added below the second layer. This may be desirable to provide additional weight as well as to prolong the useful life of the second layer of wear shoes. The third layer of wear shoes could, for example, be welded to the second layer. These and other modifications of a similar nature are all intended to be included within the scope of the present invention as defined by the following claims.

I claim:

1. A wear shoe apparatus for coupling to the bottom of a trawl door used in opening a trawl being pulled behind a fishing boat, said apparatus including a bottom wear shoe comprising:

a bottom having an upper surface and a lower surface;

two side walls extending upward from the bottom and having respective inner and outer surfaces, whereby a channel is defined by the upper surface of said bottom and said inner surfaces of said side walls, said channel being sized to be adapted to accommodate a bottom portion of the trawl door, said side walls having a plurality of through holes formed therein, with corresponding holes in the side walls being aligned with each other and adapted to receive therein an elongated fastening member;

wherein said bottom wear shoe has a given height, said apparatus further comprising a mudshoe attached to said bottom wear shoe, and a projection attached to and below said bottom wear shoe.

* * * * *